(12) United States Patent
Knott et al.

(10) Patent No.: US 12,156,093 B2
(45) Date of Patent: Nov. 26, 2024

(54) METHOD AND SYSTEM FOR ACCESSING A FUNCTIONALITY OF A VEHICLE VIA A MOBILE DEVICE

(71) Applicant: Bayerische Motoren Werke Aktiengesellschaft, Munich (DE)

(72) Inventors: Thorsten Knott, Tuntenhausen (DE); Daniel Knobloch, Mountain View, CA (US); Daniel Kuelzer, Munich (DE); Alaa Mourad, Munich (DE)

(73) Assignee: Bayerische Motorenwerke Aktiengesellschaft, Munich (DE)

( * ) Notice: Subject to any disclaimer, the term of this patent is extended or adjusted under 35 U.S.C. 154(b) by 301 days.

(21) Appl. No.: 17/644,133

(22) Filed: Dec. 14, 2021

(65) Prior Publication Data
US 2023/0188930 A1 Jun. 15, 2023

(51) Int. Cl.
*H04W 4/02* (2018.01)
*H04W 4/40* (2018.01)

(52) U.S. Cl.
CPC .............. *H04W 4/023* (2013.01); *H04W 4/40* (2018.02)

(58) Field of Classification Search
CPC .......... H04W 4/023; H04W 4/40; H04W 4/80
See application file for complete search history.

(56) References Cited

U.S. PATENT DOCUMENTS

| | | | |
|---|---|---|---|
| 11,582,611 B1* | 2/2023 | Kwong | H04W 4/023 |
| 2016/0107611 A1* | 4/2016 | Siswick | H04W 4/029 340/425.5 |
| 2019/0135229 A1* | 5/2019 | Ledvina | H04W 76/10 |
| 2020/0218250 A1* | 7/2020 | Fuke | G06F 18/22 |
| 2020/0275244 A1* | 8/2020 | Lee | G01S 5/0284 |
| 2021/0402955 A1* | 12/2021 | Ahmed | H04W 4/023 |
| 2022/0032920 A1* | 2/2022 | Varughese | H04W 4/40 |
| 2022/0371549 A1* | 11/2022 | Park | B60R 25/209 |
| 2023/0156424 A1* | 5/2023 | Lee | G01S 13/931 455/456.1 |
| 2023/0262467 A1* | 8/2023 | Lee | H04W 12/03 713/170 |

* cited by examiner

*Primary Examiner* — Nguyen T Vo
(74) *Attorney, Agent, or Firm* — Kieran O'Leary; 2SPL Patent Attorneys PartG mbB

(57) ABSTRACT

Embodiments relate to a method for accessing a functionality of a vehicle via a mobile device. The method includes sending, using a first radio access technology, RAT, a ranging intent message from the mobile device to the vehicle; initiating, by the vehicle and using a second RAT, a ranging session for localizing the mobile device upon receipt of the ranging intent message; and upon initiating the ranging session, sending a ranging response message from the vehicle to the mobile device using the first RAT, the ranging response message indicating whether the mobile device is inside or outside at least one operational localization range of the vehicle.

14 Claims, 2 Drawing Sheets

METHOD AND SYSTEM FOR ACCESSING A FUNCTIONALITY OF A VEHICLE VIA A MOBILE DEVICE

FIELD

The present disclosure relates to the field of keyless entry systems and, more particularly, to methods and apparatuses for accessing a functionality of a vehicle via a mobile device.

BACKGROUND

The Car Connectivity Consortium® (CCC) is a cross-industry organization advancing global technologies for smartphone-to-car connectivity solutions. CCC is developing Digital Key, an open standard to allow smart devices, like smartphones to act as a vehicle key. Digital Key will let drivers lock and unlock their cars, and even let them start the engine and share access to friends or valets, using their phones.

Digital Key Release 3.0 specification adds Bluetooth Low Energy (BLE) and Ultra-Wideband (UWB) wireless connectivity technologies to enable compatible mobile devices with passive keyless access and engine start. The Digital Key Release 3.0 through implementation of UWB connectivity adds hands-free, location-aware keyless access and location-aware features for an improved user-friendly experience. It maintains support for NFC technology as a back-up solution. UWB is a radio-based communications technology for short range, high speed spatial and directional transmission of data. Digital Key Release 3.0 addresses security and usability by authenticating the Digital Key between a vehicle and the mobile device over BLE and then establishing a secure ranging session with UWB, which allows the vehicle to perform secure and accurate distance measurement to localize the mobile device.

The smart device and vehicles antennas may be used to establish corresponding radio links where a BLE radio link may be used as a primary communication channel. UWB based two-way ranging may be used as a means for the vehicle to determine the position of the smart device relative to the car. The BLE communication channel may be used, amongst others, to start and end UWB ranging. Based on the smart devices' position relative to the car, the vehicle can offer and perform certain features (e.g., unlock on approach, lock on walking away, remotely controlling the car while being within a certain distance to the car).

While the BLE radio link can be kept alive for long durations and over long distances, UWB ranging can only be performed for a limited duration and in limited distance to the car. This is mainly due to relatively high energy consumption associated with active two-way ranging for both smart device and vehicle. Further, potential privacy issues connected to the vehicle may be limited when continuously locating the smart device.

To ensure that UWB ranging is running when needed before a user reaches the car (e.g., for the unlock on approach feature), the CCC standard describes a procedure, where the smart device triggers UWB ranging by sending a specific message ("ranging intent message") to the vehicle before reaching the vehicle.

The smart device may use an algorithm ("ranging intent algorithm") to determine if the user carrying the smart device could be approaching the vehicle using limited sensor data as an input (e.g., BLE RSSI, motion sensor data, . . . ). Currently, no details of the vehicle specific BLE antenna positions and BLE characteristics are shared with the smart device, making it necessary to specifically configure the ranging intent algorithm for a tuple (smart device product, vehicle product). Further, no sufficient indication of the performance of the ranging intent algorithm is available to the smart device, making it hard to monitor the performance of the ranging intent algorithm in use and to improve on the ranging intent algorithm based on actual customer data accordingly. Yet further, no details of the vehicle specific feature set and corresponding requirements (e.g., requirement for the distance that localization should be started at) is shared between the vehicle and the device, making it necessary to specifically configure the ranging intent algorithm for the relevant feature set active in a specific vehicle product.

Thus, there may be a demand for an improved ranging intent procedure.

This demand may be satisfied by the subject-matter of the appended independent and dependent claims.

SUMMARY

According to a first aspect, the present disclosure provides a method for accessing a functionality of a vehicle via a mobile device. The method includes sending, using a first Radio Access Technology (RAT), a ranging intent message from the mobile device to the vehicle. Upon receipt of the ranging intent message, the vehicle initiates or establishes, using a second RAT, a ranging session for localizing the mobile device upon receipt of the ranging intent message. Upon initiating/establishing the ranging session, a ranging response message is sent from the vehicle to the mobile device using the first RAT. The ranging response message indicates whether the mobile device is inside or outside the vehicle's operational localization range. Feedback in form of the ranging response message may allow evaluating and thus optimizing a performance of a ranging intent algorithm running on the mobile device.

In some embodiments, a communication range of the first RAT is larger than a communication range of the second RAT. In this way, the ranging intent message may be exchanged over larger distances between mobile device and vehicle compared to distances between mobile device and vehicle in which localization of the mobile device via the second RAT is possible.

In some embodiments, the vehicle may generate a beacon signal using the first RAT. The ranging intent message may be sent from the mobile device to the vehicle if a power measurement of the beacon signal at the mobile device exceeds a predefined threshold. That is, the ranging intent message may be sent from the mobile device to the vehicle if the mobile device approaches the vehicle, leading to an increased received power of the beacon signal.

In some embodiments, the first RAT may comprise Bluetooth radio access technology. Bluetooth is a short-range wireless technology standard that is used for exchanging data between fixed and mobile devices over short distances (<100 m) using UHF (Ultra High Frequency) radio waves in the ISM (Industrial, Scientific, and Medical) bands, from 2.402 GHz to 2.48 GHz. Bluetooth uses a radio technology called frequency-hopping spread spectrum. Bluetooth divides transmitted data into packets and transmits each packet on one of 79 designated Bluetooth channels. Each channel has a bandwidth of 1 MHz. It usually performs 1600 hops per second, with adaptive frequency-hopping (AFH) enabled. Bluetooth Low Energy uses 2 MHz spacing, which accommodates 40 channels. In some example implementations, the ranging intent message and the ranging response message are exchanged between the mobile device and the vehicle via a Bluetooth Low Energy (BLE) radio link.

In some embodiments, the second RAT may be Ultra-Wideband (UWB) radio access technology which is a radio technology that can use a very low energy level for short-range, high-bandwidth communications over a large portion of the radio spectrum. UWB in accordance with IEEE 802.15.4z-2020 may be used for precision locating and tracking applications. Ranging may be performed within an operational localization range of e.g. five meters around the car and with spatial resolutions of less than a millimeter. In some example implementations, the ranging session comprises localizing the mobile device using an UWB ranging protocol between the vehicle and the mobile device.

If the vehicle determines that the mobile device's position is outside the operational localization range, a ranging response message may be sent from the vehicle to the mobile device indicating that the mobile device is outside the vehicle's operational localization range (i.e., UWB ranging is not possible). On the other hand, if the vehicle determines that the mobile device's position is inside the operational localization range, a ranging response message may be sent from the vehicle to the mobile device indicating that the mobile device is inside the vehicle's operational localization range (i.e., UWB ranging is possible).

If the vehicle determines that the mobile device changes its position from inside the operational localization range to outside the operational localization range, a ranging response message may be sent from the vehicle to the mobile device indicating that the mobile device is outside the vehicle's operational localization range. If the vehicle determines that the mobile device changes its position from outside the operational localization range to inside the operational localization range, a ranging response message may be sent from the vehicle to the mobile device indicating that the mobile device is inside the vehicle's operational localization range. In this way, the mobile device's position relative to the vehicle and hence the operational localization range may be individually tracked.

In some embodiments, the method may further include determining that the mobile device has triggered the ranging intent message too late if the vehicle's ranging response message indicates that the mobile device is inside the vehicle's operational localization range. Hence, certain parameters of the ranging intent algorithm may be adapted to trigger the ranging intent message earlier.

In some embodiments, the method may further include determining that the mobile device did not trigger the ranging intent message in time if the ranging session is triggered in response to a user manually triggering a vehicle feature and the vehicle's ranging response message indicates that the mobile device is inside the vehicle's operational localization range. Hence, certain parameters of the ranging intent algorithm may be adapted to trigger the ranging intent message earlier.

In some embodiments, the method may further include determining that the mobile device has triggered the ranging intent message in time if the vehicle's first ranging response message indicates that the mobile device is outside the vehicle's operational localization range. This may indicate that the ranging intent algorithm works as intended.

In some embodiments, the method may further include determining that the mobile device has triggered the ranging intent message in time if the vehicle's second ranging response message subsequent to the first ranging response message indicates that the mobile device is inside the vehicle's operational localization range. This may indicate that the ranging intent algorithm works as intended.

In some embodiments, the method may further include determining a false positive result of the method if no subsequent second ranging response message indicating that the mobile device is inside the vehicle's operational localization range is received.

In this way, true positive, false positive, true negative, and false negative results of a ranging intent algorithm running on the mobile device may be identified. This may help to optimize the ranging intent algorithm for a specific mobile device-vehicle pair.

In some embodiments, the method may further include selecting a power measurement threshold minimizing false positive results of the method while keeping false negative results of the method below a predefined level. The power measurement threshold may be used by the ranging intent algorithm running on the mobile device for measuring the beacon signal (e.g., BLE beacon signal).

In some embodiments, the method may further include selecting a power measurement threshold minimizing false negative results of the method while keeping false positive results of the method below a predefined level. The power measurement threshold may be used by the ranging intent algorithm running on the mobile device for measuring the beacon signal (e.g., BLE beacon signal).

According to a second aspect, the present disclosure provides system for accessing a functionality of a vehicle. The system comprises a mobile device and a vehicle. The mobile device is configured to send, using a first RAT, a ranging intent message from the mobile device to the vehicle. The vehicle is configured to initiate or establish, using a second RAT, a ranging session for localizing the mobile device upon receipt of the ranging intent message, and, upon initiating/establishing the ranging session, send a ranging response message to the mobile device using the first RAT, the ranging response message indicating whether the mobile device is inside or outside the vehicle's operational localization range.

According to a third aspect, the present disclosure provides a mobile device for accessing a functionality of a vehicle. The mobile device comprises transceiver circuitry configured to transmit a ranging intent message to the vehicle using a first RAT and, in response to the ranging intent message, receive a ranging response message from the vehicle via the first RAT, the ranging response message indicating whether the mobile device is inside or outside the vehicle's operational localization range. The transceiver circuitry is configured for a second RAT ranging session for localizing the mobile device.

According to a fourth aspect, the present disclosure provides a vehicle. The vehicle comprises transceiver circuitry configured to receive a ranging intent message from a mobile device via a first RAT, and, in response to the ranging intent message, transmit a ranging response message to the mobile device via the first RAT. The ranging response message indicates whether the mobile device is inside or outside the vehicle's operational localization range. The transceiver circuitry is configured for a second RAT ranging session for localizing the mobile device.

BRIEF DESCRIPTION OF THE FIGURES

Some examples of apparatuses, methods and/or computer programs will be described in the following by way of example only, and with reference to the accompanying figures, in which.

DETAILED DESCRIPTION

Various example embodiments will now be described more fully with reference to the accompanying drawings in which some example embodiments are illustrated. In the figures, the thicknesses of lines, layers or regions may be exaggerated for clarity. Optional components may be illustrated using broken, dashed, or dotted lines.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the invention. Like numbers refer to like or similar elements throughout the description of the figures.

As used herein, the term "or" refers to a non-exclusive or, unless otherwise indicated (e.g., "or else" or "or in the alternative"). Furthermore, as used herein, words used to describe a relationship between elements should be broadly construed to include a direct relationship or the presence of intervening elements unless otherwise indicated. For example, when an element is referred to as being "connected" or "coupled" to another element, the element may be directly connected or coupled to the other element or intervening elements may be present. In contrast, when an element is referred to as being "directly connected" or "directly coupled" to another element, there are no intervening elements present. Similarly, words such as "between", "adjacent", and the like should be interpreted in a like fashion.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "includes", or "including", when used herein, specify the presence of stated features, integers, steps, operations, elements or components, but do not preclude the presence or addition of one or more other features, integers, steps, operations, elements, components or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Figure 1:
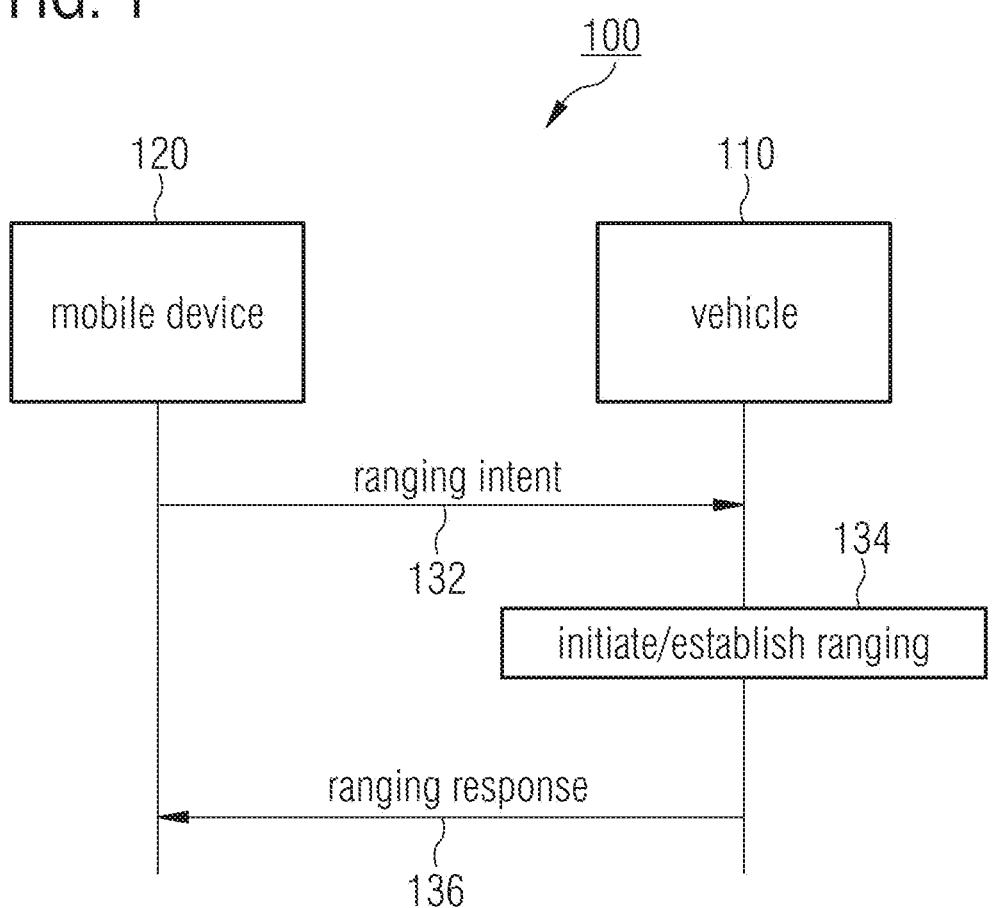
FIG. 1 shows a chart of a method for accessing a functionality of a vehicle via a mobile device 120 according to an embodiment.

FIG. 1 shows a flowchart of a method 100 for accessing a functionality of a vehicle 110 via a mobile device 120.

In some embodiments, the vehicle 110 may be a car. However, the skilled person will appreciate that the teachings of the present disclosure are not limited to cars but may be applied to any other vehicles that transports people or cargo. Vehicles include wagons, bicycles, motor vehicles (motorcycles, cars, trucks, buses), railed vehicles (trains, trams), watercraft (ships, boats), amphibious vehicles (screw-propelled vehicle, hovercraft), aircraft (airplanes, helicopters, aerostat) and spacecraft. The vehicle 110 may be equipped with wireless communication transceiver circuitry and one or more antennas for wireless communication. The wireless communication transceiver circuitry may implement a plurality of wireless communication standards or RATs.

The functionality of the vehicle 110 to be accessed may be a wireless or digital key functionality, such as a door open/close or an engine start functionality, for example. However, the skilled person having benefit from the present disclosure will appreciate that the teachings of the present disclosure are not limited to those functionalities but may be applied to a variety of the vehicle functionalities such as comfort and/or infotainment functionalities, for example.

The mobile device 120 may comprise a portable wireless communication device owned by a user. The mobile device 120 may be a wireless communication device that can perform (or is configured to perform) wireless communication via a plurality of wireless communication standards or RATs. For example, the mobile device 120 may be smartphone, a tablet PC, a smartwatch, etc. The mobile device 120 may be used as a digital key for accessing one or more functionalities of vehicle 110.

Mobile device 120 and vehicle 110 may communicate with each other over one or more wireless communication channels for setup of a secure ranging session or procedure. The communication for preparing the ranging session by be done using a first RAT. The secure ranging session itself may be performed using a second RAT which may have a smaller communication range than the first RAT. Both communication via the first and the second RAT need not be controlled by a base station, i.e., wireless resources might not be scheduled by a base station. Instead, the wireless communication devices may decide for themselves which wireless resources on a wireless channel they use. The secure ranging session may include communication between vehicle 110 and mobile device 120 for secure ranging to securely determine the distance between device 120 and vehicle 120 to support a secure distance measurement for passive entry and passive engine start functionality, for example.

Turning back to FIG. 1, method 100 includes sending a ranging intent message 132 from the mobile device 120 to the vehicle 110. The ranging intent message is sent using the first RAT. The first RAT may be Bluetooth and, more particularly, Bluetooth LE (BLE). Mobile device 120 and vehicle 110 may each comprise a respective BLE transceiver module. Among other functionalities, the BLE transceiver modules of mobile device 120 and vehicle 110 may be used to communicate for setup of a secure ranging session between mobile device 120 and vehicle 110. BLE communication may be used to discover, manage, and control ranging between mobile device 120 and vehicle 110. BLE may offer secure data exchange between mobile device 120 and vehicle 110 which may then enable mutual authentication and data sharing over a secure channel with the vehicle 110. The BLE channel may be required to establish and or manage a secure ranging service. Several ranging service messages may be available for this purpose. Thus, the skilled person having benefit from the present disclosure will appreciate that, subsequent to the ranging intent message 132, one or more further ranging service messages may be exchanged between vehicle 110 and mobile device 120 via the first RAT (e.g., BLE) in order to prepare a (secure) ranging session via the second RAT.

Upon receipt of the ranging intent message 132 from the mobile device 120, the vehicle 110 initiates or establishes, using the second RAT, a (secure) ranging session 134 for localizing the mobile device 120. The second RAT may include an Ultra-Wide-Band (UWB) communication protocol, e.g., such as IEEE 802.15.4z (a communication protocol specified by the Institute of Electrical and Electronics Engineers). The UWB physical layer uses a waveform based on an impulse radio signal using band-limited pulses. The UWB physical layer may be primarily used for ranging but may also be used for data communication. Mobile device 120 and vehicle 110 may each comprise a respective UWB transceiver module to communicate with each other for secure ranging to securely determine the distance between device 120 and vehicle 110 to support a secure distance measurement for passive entry and passive engine start functionality. The vehicle may be equipped with multiple UWB antennas located in positions in and around the vehicle. Localization of the mobile may involve determining respective communication roundtrip times of localization signal from each UWB antenna of the vehicle 110 to the mobile device 120. Based on the different roundtrip times, a position of the mobile device 120 relative to the vehicle 110 may be determined.

Initiating the ranging session 134 may be understood as starting to set up the ranging session 134 via the second RAT. If the ranging session 134 has been set up or established successfully, the vehicle 110 and the mobile device 120 are in mutual communication range and ranging/localization results may be determined. If the ranging session 134 has not been set up or established successfully after a certain time, the vehicle 110 and the mobile device 120 may be outside mutual communication range and ranging/localization results cannot be determined.

Upon initiating/establishing the ranging session 134, a ranging response message 136 is sent from the vehicle 110 to the mobile device 120 using the first RAT (e.g., BLE). There may be a certain time between initiating/establishing the ranging session 134 and sending the ranging response message 136. This time may be due a time it takes to establish the ranging session 134 or to find out that the ranging session 134 could not be established. The ranging response message indicates whether the mobile device 120 is inside or outside an operational localization range of the vehicle. The operational localization range may be a range around the vehicle 110 in which a localization of the mobile device 120 is possible. Thus, the operational localization range may be dependent on the communication range of the second RAT (e.g., UWB). It is noted that there may also be more than one operational localization range. For example, different operational localization ranges may be defined by using different signal powers of localization signals.

Figure 2:
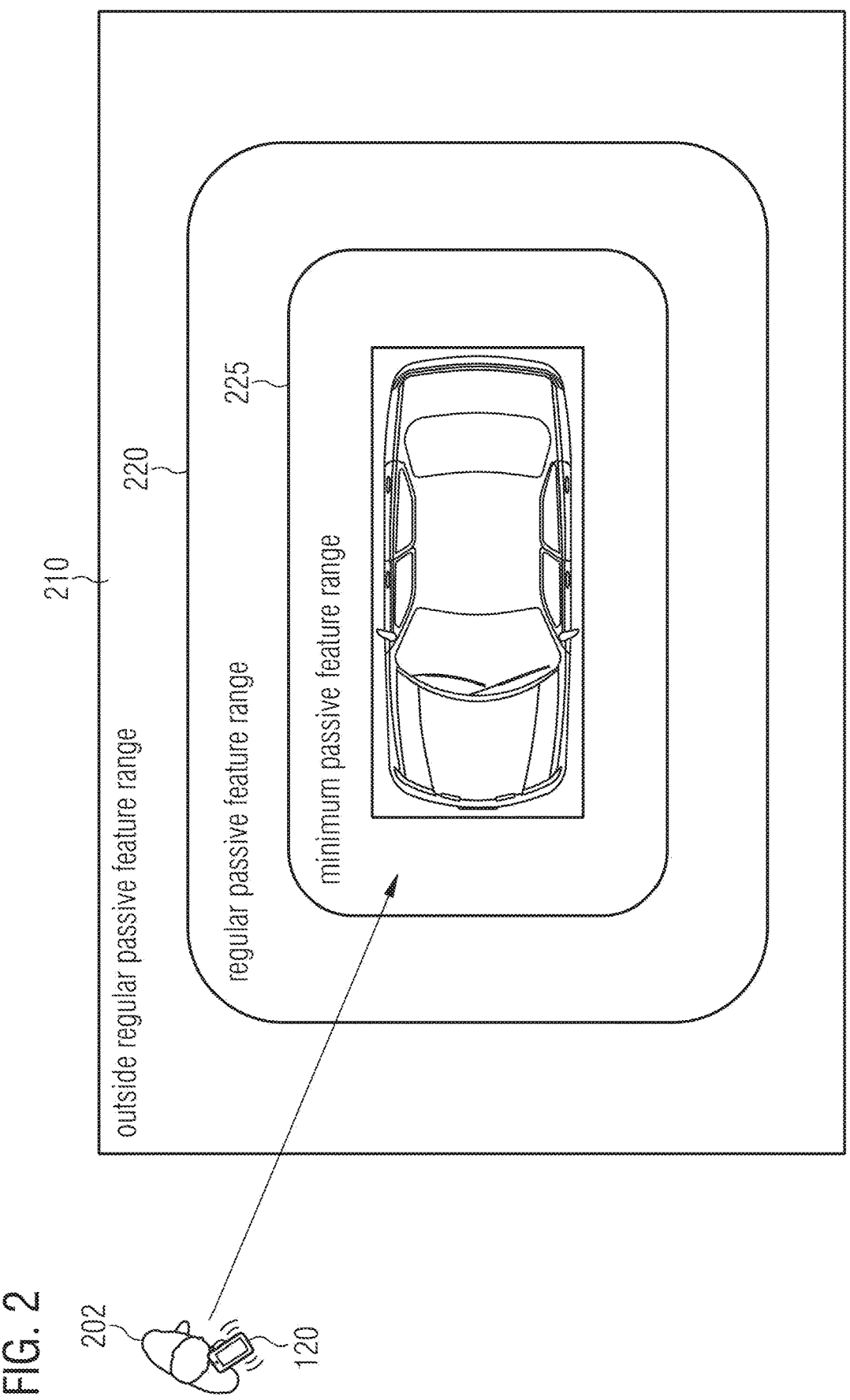
FIG. 2 shows an example of an operational localization range around a vehicle.

An example of two operational localization ranges around a vehicle 110 is illustrated in FIG. 2.

FIG. 2 shows an owner/user 202 carrying a mobile device 120 approaching a vehicle 110. In the depicted situation, user 202 is in an area 210 outside a first operational localization range 220. This means that UWB ranging will not be possible at the user's current position as a range (reach) of UWB ranging signals is less than a distance between the user 202 and the vehicle 110. A second operational localization range 225 is shown inside first operational localization range 220. The second inner operational localization range 225 may become relevant, for example, if only little battery power and hence less signal power for localization is available.

Vehicle 110 may be configured to generate a BLE beacon signal using its BLE transceiver module and one or more BLE antennas inside or outside the vehicle. Bluetooth beacons are hardware transmitters—a class of BLE devices that may broadcast their identifier to nearby portable electronic devices 120. The technology may enable smartphones, tablets and other devices to perform actions when in close proximity to a beacon. Bluetooth beacons use BLE proximity sensing to transmit a universally unique identifier picked up by a compatible app or operating system. The identifier and several bytes sent with it may be used to determine the device's physical location, track customers, or trigger a location-based action on the device.

The mobile device's 120 location relative to the vehicle 110 may be determined based on a received BLE beacon signal power measurement, for example. A received signal strength indicator (RSSI) is a measurement of the power present in a received radio signal. Thus, the mobile device 120 may send the ranging intent message to the vehicle 110 if a power measurement (RSSI) of the vehicle's BLE beacon signal at the mobile device 120 exceeds a predefined threshold. This may be indicating that the mobile device is in proximity of the vehicle 110 (e.g., <15 m). In this case, the mobile device 120 and the vehicle may communicate via one or more BLE channels and exchange the ranging intent message and the ranging response message via BLE. As can be seen from FIG. 2, the communication range of BLE is larger than the communication range of UWB (operational localization ranges 220, 225). While a range of BLE can be up to 100 m, the communication range of UWB (operational localization range 220) may be less than 10 m, even less than 5 m.

Upon receipt of the BLE the ranging intent message, the vehicle 110 may initiate/establish UWB ranging. That is, the vehicle 110 may start a UWB ranging protocol which may involving transmitting UWB ranging signals to the mobile device 120 and receiving UWB ranging signals from the mobile device 120 from which roundtrip times and hence distances may be determined. If the mobile device 120 is outside the vehicle's operational localization range 210, the vehicle 110 will not receive UWB ranging (response) signals. If the mobile device 120 is inside the vehicle's operational localization range 210, the vehicle 110 will receive UWB ranging (response) signals.

A mentioned before, the BLE ranging response message from the vehicle 110 indicates whether the mobile device 120 is inside or outside the vehicle's operational UWB localization range 220. For example, if it is determined via the UWB ranging protocol that the mobile device's 120 current position is outside the operational localization range, a BLE ranging response message may be sent from the vehicle 110 to the mobile device 120 via a BLE link, wherein the BLE ranging response message indicates that the mobile device 120 is outside the vehicle's 110 operational UWB localization range 220. The UWB ranging protocol may determine that the mobile device's 120 current position is outside the operational UWB localization range if no UWB communication links can be set up between vehicle 110 and mobile device, for example. If the vehicle 110 determines that the mobile device's 120 position is inside the operational UWB localization range 220, a BLE ranging response message may be sent from the vehicle 110 to the mobile device 120 via a BLE link, wherein the BLE ranging response message indicates that the mobile device 120 is inside the vehicle's 110 operational UWB localization range 220. This may happen if the user 202 of FIG. 2 further approaches the vehicle 110.

If the vehicle 110 determines that the mobile device 120 changes its position from inside the operational UWB localization range 220 to outside the operational UWB localization range 220, the vehicle 110 may send a BLE ranging response message indicating that the mobile device 120 is outside the vehicle's operational UWB localization range. If the vehicle 110 determines that the mobile device 120 changes its position from outside the operational UWB localization range 220 to inside the operational UWB localization range 220, the vehicle 110 may send a BLE ranging response message indicating that the mobile device 120 is inside the vehicle's operational UWB localization range.

Thus, vehicle UWB localization software may be preconfigured with one or more "operational ranges" which is the area 220, 225 in and around the car where localization of the smart device 120 is expected to work based on the specific vehicle's feature set. During operation of the system, whenever the mobile device 120 approaches the vehicle 110 and the ranging intent message is sent by the mobile device 120, UWB ranging is started by the vehicle 110. As soon as UWB ranging setup is finished, the vehicle 110 may send one of two messages to the mobile device 120:

"device in operational range", indicating that the mobile device 120 is inside the vehicle's operational range, or "device outside operational range", indicating that the mobile device 120 is outside the vehicle's operational range.

While UWB ranging is active, any time the vehicle 110 determines the mobile device 120 changes its position from the inside the operational range 220 to outside the operational range 220 or vice versa, the corresponding message may be sent by the vehicle 110 to the mobile device 120.

The BLE ranging response message may be used to provide immediate feedback from the vehicle 110 to the mobile device 120. This feedback may be used to measure performance of a ranging intent algorithm implemented in the mobile device 120 for a specific pair/tuple (smart device, vehicle). For example, a ranging response message indicating that the mobile device 120 is inside the operational localization range 220 may indicate that the ranging intent message was sent too late. In this case, the BLE RSSI threshold for triggering the ranging intent message in the ranging intent algorithm may be adapted (e.g., decreased). The disclosed concept provides a process to configure the ranging intent algorithm for a specific tuple (smart device, vehicle) using the performance data, where data gathering can be performed either a priori for a certain combination (smart device product, vehicle product) or online (during use), i.e., with the smart device 120 and vehicle 110 in operation by the user 202.

A basic principle of configuring the ranging intent algorithm may comprise the following:

The mobile device 120 may capture input data (e.g., BLE RSSI measurements, ranging response messages, etc.) to the ranging intent algorithm while the algorithm is executed and while UWB ranging is running. The digital key feature may be used in combination with a specific tuple (smart device, vehicle) in a number of user relevant scenarios (e.g., user approaching car, user walking away from car, etc.). The ranging intent algorithm's parameters (e.g., BLE RSSI threshold triggering ranging intent message) may be changed based on input data and ranging intent algorithm performance data gathered during operation. For example, standard machine learning methods may be used to either improve the ranging intent algorithm a priori, after gathering enough training and test data. The ranging intent algorithm may also be improved online (during operation in the field), after each ranging intent trigger by the algorithm. If needed, several different parameter configurations of the ranging intent algorithm can be derived from the same performance data, which can be used at certain points during operation according to the specific necessities.

The performance of the ranging intent algorithm in terms of numbers of (true positive, false positive, false negative) may be measured the following way:

If the ranging intent message 132 was sent by the mobile device 120 and the vehicle 110 subsequently sent the ranging response message "device in operational range", the ranging intent algorithm triggered the ranging intent message too late (false negative).

If the ranging intent algorithm on the mobile device 120 was active but UWB ranging was only started when the user 202 manually triggered a vehicle feature (e.g., requesting vehicle access by touching the vehicles door handle sensors) and the vehicle 110 subsequently sends the BLE ranging response message "device in operational range" to the mobile device 120, the ranging intent algorithm did not trigger the ranging intent message in time (false negative).

If the ranging intent message 132 was sent by the mobile device 120 and the vehicle 110 subsequently sent the ranging response message "device outside of operational range" the ranging intent algorithm triggered the ranging intent message in time. Then, the following cases may be distinguished:

If, within a predefined time period (e.g., 0 s-20 s) after the first ranging response message a subsequent ranging response message "device in operational range" is received by the mobile device 120, the ranging intent algorithm produced a true positive.

If no subsequent ranging response message "device in operational range" is received by the mobile device 120 within the predefined time period after the first ranging response message, the ranging intent algorithm produced a false positive.

In some embodiments, the ranging intent algorithm can be optimized using one of the following optimization goals:

Minimizing false positives while keeping false negatives at a very low level (e.g., <1%). This may lead to optimizing energy consumption while ensuring a very high performance level. The corresponding parameter set can be used when enough energy is present in the system. Minimizing false negatives while keeping false positives at a low level (e.g. <50%). This may lead to optimizing performance while ensuring a very low energy consumption. The corresponding parameter set can be used when energy resources in the system are very limited. Optimization of the ranging intent algorithm may include adjusting the BLE RSSI threshold triggering the ranging intent message 132, for example. That is, method 100 may include selecting a power measurement threshold minimizing false positive results of the method while keeping false negative results of the method below a predefined level. Method 100 may include selecting a power measurement threshold minimizing false negative results of the method while keeping false positive results of the method below a predefined level.

Embodiments of the present disclosure propose a ranging response message in response to the range intent message to provide immediate feedback to the mobile device. This feedback may be used to measure performance of the algorithm for a specific tuple (smart device, vehicle).

Embodiments of the present disclosure thus involve a mobile device 120 for accessing a functionality of a vehicle. The mobile device comprises transceiver circuitry configured to transmit a ranging intent message to the vehicle using a first RAT and, in response to the ranging intent message, receive a ranging response message from the vehicle via the first RAT, the ranging response message indicating whether the mobile device is inside or outside the vehicle's operational localization range. The mobile device's transceiver circuitry is configured for a second RAT ranging session for localizing the mobile device. Embodiments of the present disclosure also involve a vehicle 110 which comprises transceiver circuitry configured to receive a ranging intent message from a mobile device via a first RAT, and, in response to the ranging intent message, transmit a ranging response message to the mobile device via the first RAT. The ranging response message indicates whether the mobile device is inside or outside the vehicle's operational localization range. The transceiver circuitry is configured for a second RAT ranging session for localizing the mobile device.

The aspects and features described in relation to a particular one of the previous embodiments may also be combined with one or more of the further embodiments to replace an identical or similar feature of that further embodiment or to additionally introduce the features into the further embodiment.

Embodiments may further be or relate to a (computer) program including a program code to execute one or more of the above methods when the program is executed on a computer, processor, or other programmable hardware component. Thus, steps, operations, or processes of different ones of the methods described above may also be executed by programmed computers, processors or other programmable hardware components. Embodiments may also cover program storage devices, such as digital data storage media, which are machine-, processor- or computer-readable and encode and/or contain machine-executable, processor-executable, or computer-executable programs and instructions. Program storage devices may include or be digital storage devices, magnetic storage media such as magnetic disks and magnetic tapes, hard disk drives, or optically readable digital data storage media, for example. Other embodiments may also include computers, processors, control units, (field) programmable logic arrays ((F)PLAs), (field) programmable gate arrays ((F)PGAs), graphics processor units (GPU), application-specific integrated circuits (ASICs), integrated circuits (ICs) or system-on-a-chip (SoCs) systems programmed to execute the steps of the methods described above.

It is further understood that the disclosure of several steps, processes, operations, or functions disclosed in the description or claims shall not be construed to imply that these operations are necessarily dependent on the order described, unless explicitly stated in the individual case or necessary for technical reasons. Therefore, the previous description does not limit the execution of several steps or functions to a certain order. Furthermore, in further embodiments, a single step, function, process, or operation may include and/or be broken up into several sub-steps, -functions, -processes or -operations.

If some aspects have been described in relation to a device or system, these aspects should also be understood as a description of the corresponding method. For example, a block, device or functional aspect of the device or system may correspond to a feature, such as a method step, of the corresponding method. Accordingly, aspects described in relation to a method shall also be understood as a description of a corresponding block, a corresponding element, a property or a functional feature of a corresponding device or a corresponding system.

The following claims are hereby incorporated in the detailed description, wherein each claim may stand on its own as a separate embodiment. It should also be noted that although in the claims a dependent claim refers to a particular combination with one or more other claims, other embodiments may also include a combination of the dependent claim with the subject matter of any other dependent or independent claim. Such combinations are hereby explicitly proposed, unless it is stated in the individual case that a particular combination is not intended. Furthermore, features of a claim should also be included for any other independent claim, even if that claim is not directly defined as dependent on that other independent claim.

REFERENCES

The following is a list of all the reference numerals used in the text and the accompanying figures of the specification. The list of reference numerals is:
- 100 method for accessing a functionality of a vehicle via a mobile device
- 110 vehicle
- 120 mobile device
- 132 ranging intent message
- 134 ranging initialization
- 136 ranging response message
- 210 area outside operational localization range
- 220 outer operational localization range
- 225 inner operational localization range

What is claimed is:

1. A method for accessing a functionality of a vehicle via a mobile device, the method comprising:
   generating, by the vehicle using a first radio access technology (RAT), a beacon signal;
   sending, using the first RAT, a ranging intent message from the mobile device to the vehicle when a power measurement of the beacon signal at the mobile device exceeds a threshold;
   initiating, by the vehicle and using a second RAT, a ranging session for localizing the mobile device upon receipt of the ranging intent message;
   upon initiating the ranging session, sending a ranging response message from the vehicle to the mobile device using the first RAT, the ranging response message indicating whether the mobile device is inside or outside at least one operational localization range of the vehicle; and
   optimizing the threshold for the ranging intent message based on the ranging response message.

2. The method of claim 1, wherein a communication range of the first RAT is larger than a communication range of the second RAT.

3. The method of claim 1, wherein the ranging intent message and the ranging response message are exchanged between the mobile device and the vehicle via a Bluetooth Low Energy, BLE, radio link.

4. The method of claim 1, wherein the ranging session comprises localizing the mobile device using an ultra-wideband, UWB, ranging protocol between the vehicle and the mobile device.

5. The method of claim 1, comprising:
   if the vehicle determines that the mobile device's position is outside the operational localization range, sending a ranging response message indicating that the mobile device is outside the vehicle's operational localization range; and if the vehicle determines that the mobile device's position is inside the operational localization range, sending a ranging response message indicating that the mobile device is inside the vehicle's operational localization range.

6. The method of claim 1, comprising:
if the vehicle determines that the mobile device changes its position from inside the operational localization range to outside the operational localization range, sending a ranging response message indicating that the mobile device is outside the vehicle's operational localization range; and
if the vehicle determines that the mobile device changes its position from outside the operational localization range to inside the operational localization range, sending a ranging response message indicating that the mobile device is inside the vehicle's operational localization range.

7. The method of claim 1, wherein optimizing the threshold for the ranging intent message comprises determining that the mobile device has triggered the ranging intent message too late if the vehicle's ranging response message indicates that the mobile device is inside the vehicle's operational localization range.

8. The method of claim 1, wherein optimizing the threshold for the ranging intent message comprises determining that the mobile device has triggered the ranging intent message not in time if the ranging session is triggered in response to a user manually triggering a vehicle feature, and the vehicle's ranging response message indicates that the mobile device is inside the vehicle's operational localization range.

9. The method of claim 1, wherein optimizing the threshold for the ranging intent message comprises determining that the mobile device has triggered the ranging intent message in time if the vehicle's first ranging response message indicates that the mobile device is outside the vehicle's operational localization range.

10. The method of claim 9, comprising determining that the mobile device has triggered the ranging intent message in time if the vehicle's second ranging response message subsequent to the first ranging response message indicates that the mobile device is inside the vehicle's operational localization range.

11. The method of claim 9, comprising determining a false positive result of the method if no subsequent second ranging response message indicating that the mobile device is inside the vehicle's operational localization range is received.

12. A system for accessing a functionality of a vehicle, the system comprising:
a mobile device configured to:
receive, using a first radio access technology (RAT), a beacon signal;
send, using the first RAT, a ranging intent message from the mobile device to the vehicle when a power measurement of the beacon signal at the mobile device exceeds a threshold, and
optimize the threshold for the ranging intent message based on a ranging response message;
the vehicle configured to:
generate, using the first RAT, the beacon signal;
initiate, using a second RAT, a ranging session for localizing the mobile device upon receipt of the ranging intent message; and
upon initiating the ranging session, send the ranging response message to the mobile device using the first RAT, the ranging response message indicating whether the mobile device is inside or outside of at least one operational localization range of the vehicle.

13. A mobile device for accessing a functionality of a vehicle, the mobile device comprising:
transceiver circuitry configured to:
receive, from the vehicle using a first radio access technology (RAT), a beacon signal;
transmit a ranging intent message to the vehicle using the first RAT when a power measurement of the beacon signal at the mobile device exceeds a threshold;
in response to the ranging intent message, receive a ranging response message from the vehicle via the first RAT, the ranging response message indicating whether the mobile device is inside or outside of at least one operational localization range of the vehicle; and
optimize the threshold for the ranging intent message based on the ranging response message,
wherein the transceiver circuitry is configured for a second RAT ranging session for localizing the mobile device.

14. A vehicle, comprising:
transceiver circuitry configured to:
receive a ranging intent message from a mobile device via a first RAT;
in response to the ranging intent message, transmit a ranging response message to the mobile device via the first RAT, the ranging response message indicating whether the mobile device is inside or outside of at least one operational localization range of the vehicle,
wherein the transceiver circuitry is configured for a second RAT ranging session for localizing the mobile device; and
in response to an initiation, by a manual triggering of a vehicle feature, of the second RAT ranging session, transmit the ranging response message indicating that the mobile device is inside the vehicle's operational localization range.

* * * * *